United States Patent
Kuhl et al.

(10) Patent No.: US 7,907,518 B2
(45) Date of Patent: Mar. 15, 2011

(54) COMMUNICATION TRAFFIC ISOLATION AND CONTROL

(75) Inventors: Tim Kuhl, Kanata (CA); David Martin Harvey, Kanata (CA); Paul Thomas Kondrat, Ottawa (CA); Neil Darren Hart, Chelsea (CA)

(73) Assignee: Alcatel Lucent, Paris (FR)

(*) Notice: Subject to any disclaimer, the term of this patent is extended or adjusted under 35 U.S.C. 154(b) by 946 days.

(21) Appl. No.: 11/268,822

(22) Filed: Nov. 8, 2005

(65) Prior Publication Data

US 2007/0104095 A1 May 10, 2007

(51) Int. Cl.
*H04L 12/26* (2006.01)
*H04L 1/00* (2006.01)
*H04L 12/54* (2006.01)

(52) U.S. Cl. ............... 370/229; 370/230.1; 370/235; 370/413

(58) Field of Classification Search ............... 370/229, 370/230, 231–234, 235, 412, 230.1, 413
See application file for complete search history.

(56) References Cited

U.S. PATENT DOCUMENTS

| | | | | |
|---|---|---|---|---|
| 5,668,951 A * | 9/1997 | Jain et al. | ...... | 709/235 |
| 6,490,251 B2 * | 12/2002 | Yin et al. | ...... | 370/236.1 |
| 6,542,466 B1 * | 4/2003 | Pashtan et al. | ...... | 370/235 |
| 6,721,273 B1 * | 4/2004 | Lyon | ...... | 370/235 |
| 6,826,151 B1 * | 11/2004 | Li et al. | ...... | 370/230.1 |
| 7,133,365 B2 * | 11/2006 | Klinker et al. | ...... | 370/238 |
| 7,161,902 B2 * | 1/2007 | Carter et al. | ...... | 370/229 |
| 7,190,669 B2 * | 3/2007 | Banerjee | ...... | 370/229 |
| 7,272,150 B2 * | 9/2007 | Bly et al. | ...... | 370/414 |
| 7,321,565 B2 * | 1/2008 | Todd et al. | ...... | 370/253 |
| 7,385,958 B2 * | 6/2008 | Demirhan | ...... | 370/338 |
| 7,411,905 B1 * | 8/2008 | Cook et al. | ...... | 370/230 |
| 7,436,844 B2 * | 10/2008 | Wang et al. | ...... | 370/412 |
| 7,502,319 B2 * | 3/2009 | Youn et al. | ...... | 370/230 |
| 7,525,911 B2 * | 4/2009 | Hara et al. | ...... | 370/230.1 |
| 7,525,915 B2 * | 4/2009 | Zaki et al. | ...... | 370/235 |
| 7,606,147 B2 * | 10/2009 | Luft et al. | ...... | 370/229 |
| 2001/0021176 A1 * | 9/2001 | Mimura et al. | ...... | 370/235 |
| 2002/0110134 A1 * | 8/2002 | Gracon et al. | ...... | 370/412 |
| 2003/0081546 A1 * | 5/2003 | Agrawal et al. | ...... | 370/229 |
| 2004/0071086 A1 * | 4/2004 | Haumont et al. | ...... | 370/230 |
| 2004/0196788 A1 * | 10/2004 | Lodha | ...... | 370/230 |
| 2005/0068890 A1 | 3/2005 | Ellis et al. | | |
| 2005/0276220 A1 * | 12/2005 | Kokko | ...... | 370/230 |
| 2006/0056308 A1 * | 3/2006 | Gusat et al. | ...... | 370/252 |
| 2006/0274770 A1 * | 12/2006 | Bottiglieri et al. | ...... | 370/403 |
| 2007/0076604 A1 * | 4/2007 | Litwack | ...... | 370/230 |
| 2007/0081454 A1 * | 4/2007 | Bergamasco et al. | ...... | 370/229 |
| 2007/0211627 A1 * | 9/2007 | Pike et al. | ...... | 370/230 |

FOREIGN PATENT DOCUMENTS

CA 2301433 2/2001

* cited by examiner

*Primary Examiner* — Kwang B Yao
*Assistant Examiner* — Candal Elpenord
(74) *Attorney, Agent, or Firm* — Eckert Seamans Cherin & Mellott, LLC

(57) ABSTRACT

Communication traffic isolation and control systems and methods are disclosed. Communication traffic streams are received and either passed or filtered by respective controllable filtering modules. The operation of the filtering modules is controlled on a per-module and thus a per-stream basis, responsive to congestion of filtered communication traffic streams at a communication traffic processing element to which the filtering modules are connected. Per-stream filtering provides traffic control for each communication traffic stream, and maintains isolation between the streams. Statistics associated with communication traffic filtered out of each stream may be collected, and possibly aggregated.

18 Claims, 3 Drawing Sheets

COMMUNICATION TRAFFIC ISOLATION AND CONTROL

FIELD OF THE INVENTION

This invention relates generally to communications and, in particular, to controlling communication traffic streams.

BACKGROUND

When transporting communication traffic from many different customers through a switch, router, or other communication equipment, it is highly desirable to ensure that communication traffic from one "misbehaving" customer cannot adversely affect other customers.

It is also generally desirable to allow overbooking of physical media used to transport communication traffic, from a communication network to the end customer, for example. Where many different services are provided on the same physical channel, overbooking the physical media allows use of lower speed and thus lower cost physical media.

If, on an overbooked physical channel, the instantaneous sum of customer traffic happens to be less than the speed of the physical media, all customers can be satisfied. Typically, the rate of any given customer's traffic will vary over time, and peaks in one customer's traffic will be cancelled out by troughs in another customer's traffic, so that the sum of customer traffic is less than the speed of the physical media. Occasionally, however, the instantaneous sum of customer traffic will exceed the speed of the physical media. In this event, a fair way is needed to share the available bandwidth amongst all the competing communication traffic flows.

Providing isolation between customers and/or services when such congestion occurs can be a very complex problem. For example, some communication chip vendors have introduced complex traffic management devices providing per flow isolation for communication traffic that competes for the same physical medium. Many routing/switch vendors have developed their own proprietary solutions to help provide such isolation. Although some existing solutions may allow isolation between 4K physical media, the industry standard System Packet Interface SPI.4 bus interface is still widely used in existing communication equipment but is limited to providing isolation between at most 256 physical media. This limit is associated with the maximum number of hardware backpressure contexts that can be supported by SPI.

Mismatch between isolation capabilities can cause problems when a component having higher isolation capabilities is to be used in existing equipment, and isolation is needed for as many physical media as possible. This type of issue can become even more problematic when a device supporting a higher number of channels receives communication traffic from, but has a lower throughput than, a device supporting the smaller number of channels.

Currently available routers, for example, typically support a few hundred interfaces on a given interface card. Modifying these routers to support thousands of physical interfaces is difficult.

Suppose that it is desired to provide isolation between 4K physical media using a router which has an existing traffic management device that provides isolation between 256 physical media using backpressuring. Although another traffic management device providing the desired 4K isolation could be added to the router and connected to receive communication traffic from the existing traffic management device, the 4K isolation would be lost if traffic becomes congested at the additional traffic management device. The additional traffic management device might be configured to discard incoming communication traffic in this event, or to effectively rely on the backpressure facility of the existing traffic management device to reduce the rate at which that device outputs communication traffic. In either case, the desired level of isolation is lost.

Thus, there remains a need for improved communication traffic isolation and control techniques.

SUMMARY OF THE INVENTION

An embodiment of the invention provides a mechanism whereby a switch or router can tie together two components that provide isolation for different numbers of physical media. A higher throughput device supporting isolation of a small number of physical media may be attached to a lower throughput device supporting isolation for a larger number of physical media, for example. Such a mechanism may allow isolation between a large number of physical media while reducing the occurrence of unfair communication traffic discards.

According to an aspect of the invention, a communication traffic control system is provided, and includes a filtering module and a controller. The filtering module is configured to receive a communication traffic stream, to filter the received communication traffic stream, and to provide a filtered communication traffic stream at an output. The output is for connection to a communication traffic processing element. The controller is operatively coupled to the filtering module and configured to control the filtering module to filter out communication traffic from the received communication traffic stream responsive to determining that the filtered communication traffic stream is congested at the communication traffic processing element.

In one embodiment, the filtering module is one of a plurality of filtering modules configured to receive and filter respective communication streams and to provide respective filtered communication traffic streams at respective outputs. Each filtering module is controllable to filter out communication traffic from its respective received communication traffic stream responsive to congestion of its filtered communication traffic stream at the communication traffic processing element.

The communication traffic processing element may include a plurality of queues for receiving and storing communication traffic of the filtered communication traffic streams. In this case, the controller may be configured to determine whether a filtered communication traffic stream is congested at the communication traffic processing element based on amounts of communication traffic stored in the plurality of queues.

The controller may receive from the communication traffic processing element an indication of one or more of: absolute amounts of communication traffic stored in the plurality of queues, and relative amounts of communication traffic stored in the plurality of queues in relation to one or more congestion thresholds. This indication may be in the form of one or more messages identifying the plurality of communication traffic streams and congestion states of the plurality of communication traffic streams.

In some embodiments, the controller is configured to determine a degree of congestion of a congested filtered communication traffic stream, and to control an amount of communication traffic filtered out of a received communication stream by a filtering module associated with a congested filtered communication traffic stream based on the degree of congestion of the congested filtered communication traffic stream.

The filtering modules may receive communication traffic from a first communication traffic management device having first communication traffic management capabilities. The communication traffic processing element may include a second communication traffic management device having second communication traffic management capabilities. The first communication traffic management device may have a higher throughput capacity and fewer traffic queues than the second communication traffic management device, for example.

The received communication traffic streams may include traffic streams associated with one or more of: different physical interfaces of the communication traffic processing element, different destinations, different customers, different services, and different priorities.

The system may also include a filtering statistics collector operatively coupled to the plurality of filtering modules and configured to collect statistics associated with communication traffic that is filtered out of the respective received communication traffic streams.

If the filtering modules receive communication traffic from a first communication traffic management device which has a first communication traffic management capabilities and collects statistics associated with communication traffic that is dropped in accordance with the first communication traffic management capabilities, a statistics aggregator may be provided to aggregate the statistics collected by the filtering statistics collector and first communication traffic device.

In one embodiment, the filtering module is configured to filter communication traffic out of the communication traffic stream in accordance with filtering preferences.

These systems may be provided, for example, in communication equipment. The communication equipment may also include other components, such as the first communication traffic management device and/or the communication traffic processing element described briefly above.

A communication traffic control method is also provided, and includes receiving a plurality of communication traffic streams, filtering the plurality of communication traffic streams to provide filtered communication traffic streams to a communication traffic processing element, determining whether a filtered communication traffic stream is congested at the communication traffic processing element, and causing communication traffic to be filtered out of a received communication traffic stream associated with a congested filtered communication traffic stream.

Where the communication traffic processing element comprises a plurality of queues for receiving and storing communication traffic of the filtered communication traffic streams, the operation of determining may be based on one or more of absolute and relative amounts of communication traffic stored in the plurality of queues.

The operation of determining may also involve determining a degree of congestion of a congested filtered communication traffic stream. In this case, the operation of causing may involve controlling an amount of communication traffic filtered out of a received communication stream associated with a congested filtered communication traffic stream based on the degree of congestion of the congested filtered communication traffic stream.

In some embodiments, the method also includes collecting statistics associated with communication traffic that is filtered out of the plurality of communication traffic streams.

The operation of receiving may involve receiving the communication traffic streams from a communication traffic management device which has communication traffic management capabilities and collects statistics associated with communication traffic that is dropped in accordance with the communication traffic management capabilities. In this case, the method may also include aggregating the statistics associated with communication traffic that is filtered out of the plurality of communication traffic streams and the statistics associated with communication traffic that is dropped in accordance with the communication traffic management capabilities.

According to one embodiment, filtering involves filtering communication traffic out of the respective communication traffic streams in accordance with filtering preferences. The filtering preferences may include preferences based on one or more of: communication traffic priority, communication traffic profile, and other communication traffic characteristics.

A further aspect of the invention provides a communication traffic control system which includes a filtering module, a filtering statistics collector, and a statistics aggregator. The filtering module is configured to receive a communication traffic stream from a communication traffic management device that discards communication traffic according to a communication traffic management scheme, and is controllable to pass or filter communication traffic out of the received communication traffic stream. The filtering statistics collector is operatively coupled to the filtering module and is configured to collect statistics associated with communication traffic that is filtered out of the received communication traffic stream. The statistics aggregator is operatively coupled to the filtering statistics collector and to the communication traffic management device, and is configured to aggregate the statistics collected by the filtering statistics collector and statistics associated with communication traffic that is dropped by the communication traffic management device according to the communication management scheme.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings, in which.

DETAILED DESCRIPTION OF PREFERRED EMBODIMENTS

Figure 1:
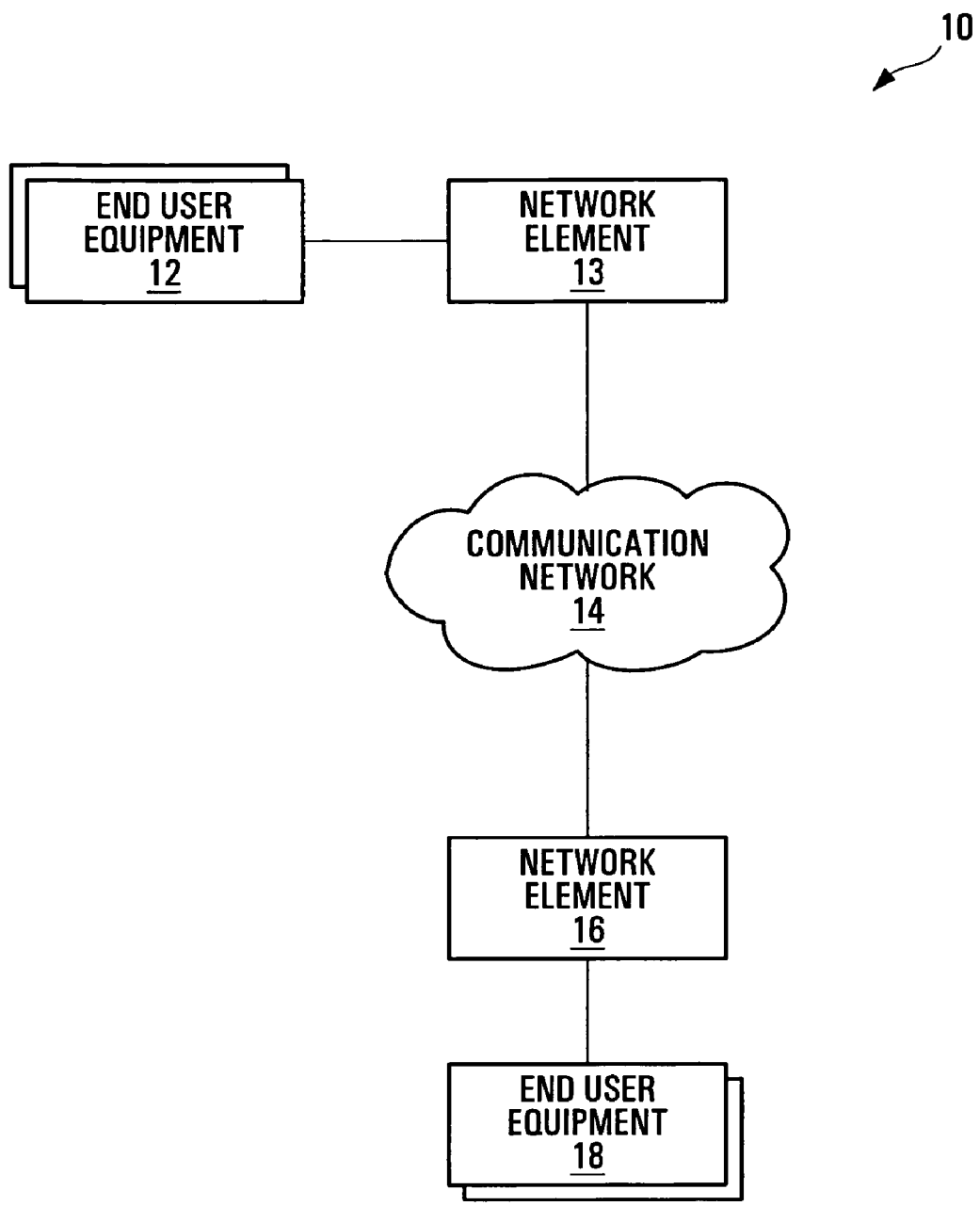
FIG. 1 is a block diagram of a communication system.

FIG. 1 is a block diagram of a communication system, and is illustrative of a system in which embodiments of the present invention might be implemented. The communication system 10 in FIG. 1 includes end user communication equipment 12, 18, network elements 13, 16, and a communication network 14. Although many installations of end user equipment 12, 18 and network elements 13, 16 may be connected to the communication network 14, only two examples of each of these components have been labelled in FIG. 1 to avoid congestion. It should therefore be appreciated that the system of FIG. 1, as well as the contents of the other drawings, are intended solely for illustrative purposes, and that the present invention is in no way limited to the particular example embodiments explicitly shown in the drawings and described herein.

The end user equipment 12, 18 represents communication equipment which is configured to generate and transmit and/ or receive and terminate communication traffic. Although shown as being directly connected to the network elements 13, 16, it will be apparent that end user equipment 12, 18 may communicate with the network elements 13, 16 through other intermediate components (not shown).

Switches and routers are illustrative of the types of communication equipment represented by the network elements 13, 16. The network elements 13, 16 provide access to the communication network 14 and thus have been shown separately in FIG. 1 for illustrative purposes.

The communication network 14, in addition to the border or edge network elements 13, 16, may also include core network elements which route communication traffic through the communication network 14.

Many different types of end user, intermediate, and network communication equipment, as well as the operation thereof, will be apparent to those skilled in the art. In general, communication traffic originating with end user equipment 12, 18, and possibly other sources of communication traffic, for transfer to a remote destination through the communication network 14 is received by a network element 13, 16, translated between different protocols or formats if necessary, and routed through the communication network 14. Embodiments of the invention are not limited to any particular types of communication equipment, transfer mechanisms, or protocols.

One common type of installation for communication network equipment such as the network elements 13, 16 includes an equipment rack having multiple slots. Each slot may include generic hardware for supporting communications with the communication network 14. A line card is then used in each slot to provide a medium- or protocol-specific interface. Using this kind of architecture, it tends to be easier to maintain spares for medium-specific modules in case of equipment failure, and substantially the same hardware core may be used in conjunction with various medium-specific modules.

As described above, communication equipment such as the network elements 13, 16 may strive to provide isolation between communication traffic streams. It may be desired to isolate communication traffic streams which target different physical media, such as 64K DSO, T1, E1, OC3, 10/100 Ethernet, etc., for example. As communication traffic flows through a switch/router for instance, different congestion points may be encountered. Communication traffic may experience congestion at such components such as an ingress line card, switch fabric, and an egress line card, among others. Despite the fact that different communication traffic streams may all flow through the same equipment and at least some common components, communication traffic streams destined for one specific physical medium should not adversely affect communication traffic destined for different physical media.

In accordance with embodiments of the invention disclosed herein, per physical medium isolation can be provided on a large number of physical media, illustratively on more than 4K different physical interfaces.

Per flow isolation within a physical medium may also or instead be provided, for a virtually unlimited number of streams. A particular embodiment of the invention supports approximately 128K stream isolation, although the techniques disclosed herein can scale beyond this.

In terms of one example implementation, when communication traffic is passed from one communication traffic management (TM) device to another TM device that supports isolation for a larger number of physical media, the presently proposed techniques provide a way to maintain isolation for the larger number of physical media. This capability can be provided by an embodiment of the invention even though the upstream TM device itself does not support the higher level of isolation of the downstream TM device. Thus, a mismatch between TM devices can be handled according to the techniques disclosed herein, to maintain isolation in implementations in which a high throughput TM device passes communication traffic to a low throughput TM device. The degree of isolation which is achievable in accordance with the present invention is independent of any traffic management capabilities of the upstream TM device. For example, the techniques described herein may be employed in conjunction with even relatively limited existing TM devices that can provide backpressure-based isolation for only up to 255 physical media.

Embodiments of the invention may similarly be used to maintain isolation for a larger number of traffic flows when communication traffic is passed from a TM device supporting a smaller number of flows to a device supporting more flows. Communication traffic flows may be associated with respective customers or groups of customers, respective destinations, and/or respective services, for example.

This concept of a traffic flow illustrates that the present invention is not limited in any way to providing per physical medium isolation. Other isolation criteria are also contemplated. Service-specific isolation may also or instead be desirable to provide isolation between communication traffic streams of different services, which may run on the same or different physical media. Embodiments of the invention provide a scalable solution for isolating communication traffic streams on the basis of any of various parameters.

References herein to communication traffic streams are intended to generally cover any or all of physical medium, customer, destination, and service isolation, as well as any other level or granularity of isolation that may be desired. The present disclosure should thus be interpreted accordingly.

Where different TM devices are used together, conventional traffic management techniques may result in unfair discards occurring on the upstream TM device or between the TM devices. According to some embodiments of the invention, traffic discards are made on the basis of a preference or order. For example, communication traffic may be discarded per flow such that non-conformant or out-of-profile traffic is discarded before other traffic. Traffic profile is an example of one communication traffic characteristic which may be used in determining the specific communication traffic that is to be discarded from a communication traffic stream.

Conventional traffic management techniques also do not deal with mechanisms for scaling numbers of communication traffic streams, and fail to address the issues associated with connecting TM devices having different isolation capabilities, to use a 256 channel high speed TM device in conjunction with a 4K channel lower speed TM device, for example.

Network elements in current communication networks typically have a single TM device that receives communication traffic at a rate higher than the sum of the rates of its egress physical interfaces. If communication traffic is being received faster than the TM device can process, a backpressure mechanism is used to tell the device from which communication traffic is being received to send communication traffic at a slower rate. The TM device may sort traffic into queues destined for specific physical ports and then schedule traffic towards each port at a rate slightly above the nominal rate of the port.

Communication traffic scheduled for all egress ports will typically be placed onto a high speed path between the TM device and the physical layer device implementing the port. The physical device is responsible for placing the data onto the physical port in the required format. There is usually a small physical device queue, which is used to determine what communication traffic to place onto the physical port at the next opportunity. A backpressure mechanism may also be used by the physical device to tell the TM device to stop sending traffic when the queue for the egress port is almost full. A separate backpressure mechanism may be used by the physical device when the TM device sends it traffic faster than the physical device can handle.

This type of TM system requires the TM device to have at a minimum one scheduler for every egress physical port/channel/interface. The number of schedulers on a TM device varies greatly with the intended application.

A separate queue is also required on the TM device to achieve per flow isolation, and this isolation relies on a signalling mechanism to the TM device scheduler to allow the scheduler to determine when high priority traffic needs to be sent, after congestion at the physical device is cleared or reduced. The number of queues, like the number of schedulers, varies greatly from one TM device to another.

In addition, the TM device must process traffic at a rate faster than the downstream physical device to ensure that highest priority communication traffic is scheduled for the physical device whenever communication traffic is available to be transmitted. If this is not possible, then port/flow isolation may be lost if congestion occurs.

One disadvantage of relying on backpressure of an upstream device is that any upstream devices which send communication traffic to a TM device must have similar or better TM characteristics. Otherwise, per port and per flow isolation will be lost and unfair discards will occur. Unless the upstream devices reduce the rates at which communication traffic is sent to the TM device, the TM device will simply discard all incoming traffic, without regard to port or flow. Such discards also cannot typically be tracked on a per flow basis, as may be desired in some systems.

As noted above, many currently available TM devices used in existing routing/switching products have been designed to support a limited number of physical ports (1 to 256 ports) with hardware backpressuring. Hardware backpressuring is faster and thus generally preferred over software backpressuring, especially in high speed applications. Given the limitations of some available hardware backpressuring techniques, however, a trend to provide highly channelized circuit cards on existing routing/switching products remains a challenge. The number of physical ports/channels required on these cards may be in excess of the 256 ports for which SPI supports hardware backpressure.

For example, in a network element requiring 4096 physical ports/channels, existing TM devices in the core architecture of the network element might support isolation for far fewer physical channels. The limitations of the upstream device in this case effectively defeat any per stream isolation provided by the downstream device.

A similar issue may arise due to differences in TM device data rates. An equipment vendor may attempt to solve the channel density problem by adding a highly channelized TM device to an existing architecture. However, highly channelized TM devices typically operate at lower bandwidths than existing architectures. Consider, for example, that highly channelized line cards which provide 4096 channels do not operate at >5 G of bandwidth, whereas in one existing architecture, TM devices operate at >10 G bandwidth. In this case, the downstream highly channelized TM device would quickly become unable to handle incoming communication traffic and be forced to simply discard traffic, thereby losing any form of isolation between communication traffic streams.

Figure 2:
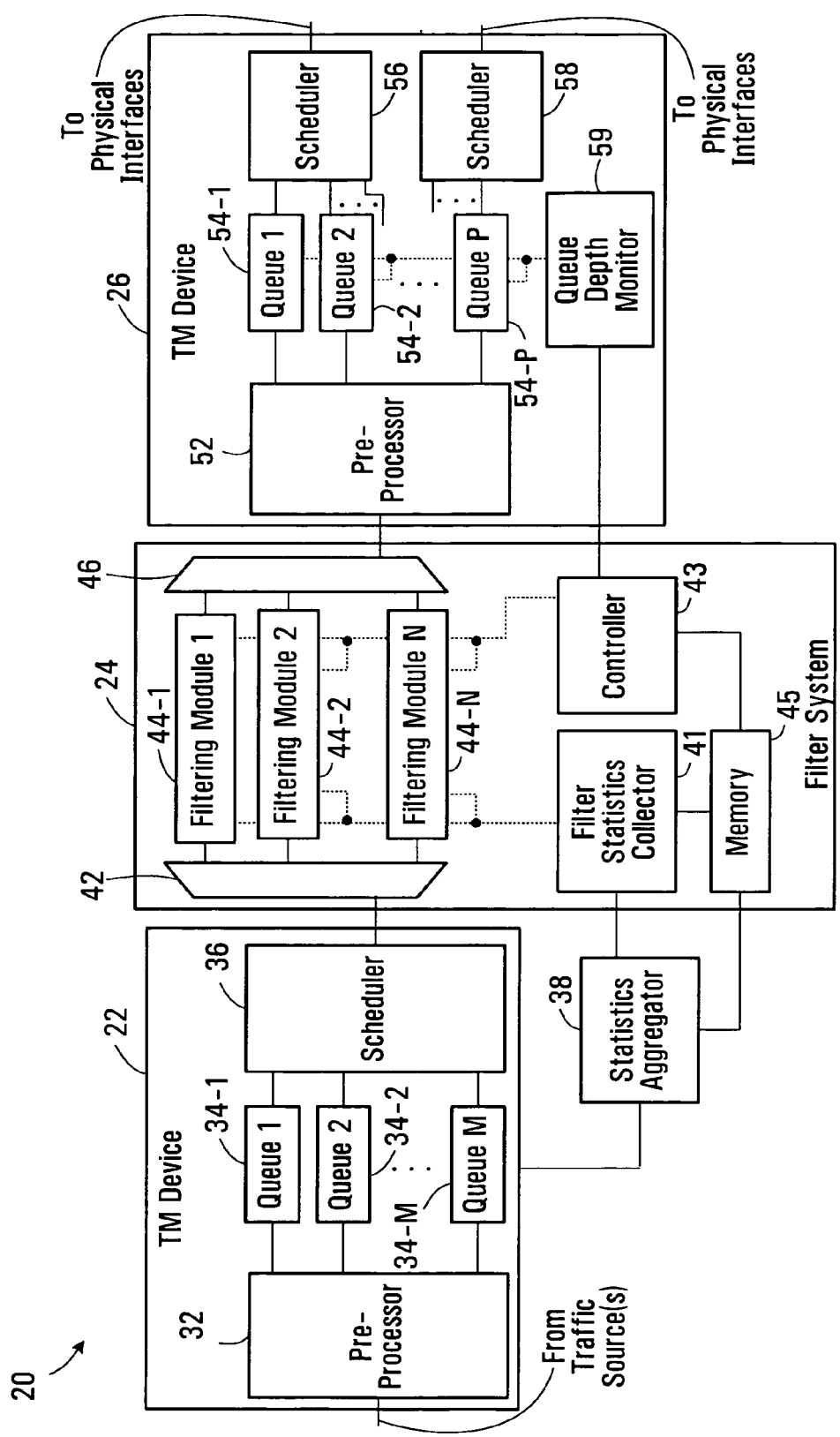
FIG. 2 is a block diagram of communication equipment incorporating a communication traffic control system.

FIG. 2 is a block diagram of an illustrative example communication network element incorporating a communication traffic control system. It should be appreciated, however, that embodiments of the invention may be implemented in other types of communication equipment than network elements, including communication equipment which is not necessarily configured for operation in a communication network.

The communication network element 20 includes two TM devices 22, 26 interconnected by a filter system 24. The TM device 22 includes a pre-processor 32, M traffic queues 34-1, 34-2, ..., 34-M operatively coupled to the pre-processor 32, and a scheduler 36 operatively coupled to the queues 34-1 to 34-M. The filter system 24 includes a demultiplexer 42 operatively coupled to the TM device 22, N filtering modules 44-1, 44-2, ..., 44-N operatively coupled to the demultiplexer 42, a multiplexer 46 operatively coupled to outputs of the filtering modules 44-1 to 44-N, a filter statistics collector 41 and a controller 43 operatively coupled to the filtering modules 44-1 to 44-N, and a memory 45 operatively coupled to the filter statistics collector 41 and to the controller 43. The TM device 26 includes a pre-processor 52, P traffic queues 54-1, 54-2, ..., 54-P operatively coupled to the pre-processor 52, schedulers 56, 58 operatively coupled to respective groups of one or more of the queues 54-1 to 54-P, and a queue depth monitor 59 operatively coupled to the queues 54-1 to 54-N and to the controller 43. The example network element 20 also includes a statistics aggregator 38 which is operatively coupled to the TM device 22, to the filter statistics collector 41, and to the memory 45.

Those skilled in the art will appreciate that a network element may include many more components than shown in FIG. 2, which perform other functions than traffic management and control. Since the present invention relates to traffic management, however, these other components have not been explicitly shown in FIG. 2 to avoid congestion.

It should also be appreciated that the present invention is in no way limited to the specific example implementation shown in FIG. 2. Embodiments of the invention are not dependent in any way on a particular type or structure of a TM device or a filter system. For example, the functions disclosed herein may be divided differently than explicitly shown in FIG. 2 between further, fewer, or different functional components which are interconnected in a similar or different manner.

In terms of physical implementation, the various functional components shown in FIG. 2 may be implemented in hardware, in software for execution by one or more processors, or in some combination thereof. In a communication equipment rack, the TM device 22 may be implemented in generic hardware installed in multiple slots, and the TM device 26, and possibly the filter system 24 and/or the statistics aggregator 38, may be implemented on a line card to be installed in one or more slots, as described briefly above. In one embodiment, a line card implementing the filter system 24, the TM device 26, and the statistics aggregator 38 is a highly channelized line card having 4096 physical ports to which communication traffic is scheduled out of the queues 54-1 to 54-P by schedulers, two of which are shown at 56, 58. Of course, other embodiments may provide different numbers of ports.

The pre-processor 32, and similarly the pre-processor 52, may perform such functions as format conversion and distribution of received communication traffic to the correct queues. With reference to FIG. 1, the network elements 13, 16 may exchange traffic over Asynchronous Transfer Mode (ATM) or Synchronous Optical Network (SONET), using Packet over SONET (POS) mechanisms for instance, with the end user communication equipment 12, 18, whereas the communication network 14 is an Internet Protocol (IP) network. In this case, the pre-processor 32 and/or the pre-processor 52 may reformat received egress communication traffic into ATM cells for transmission over physical interfaces operatively coupled to the TM device 26. These and other types of pre-processing will be well understood by those skilled in the art.

Those skilled in the art will also be familiar with various queuing strategies which may be used in the TM devices 22, 26. The TM device 22 may use two or more queues per communication traffic source to provide separate queuing for Expedited Forwarding (EF) and Best Effort (BE) IP traffic, for instance. Queues at the TM device 26 may be used in a similar or different manner, such as to provide separate queuing for different priorities of communication traffic for one or more communication traffic streams.

Each of the schedulers 36, 56, 58 extracts communication traffic from its connected queues 34-1 to 34-M, 54-1 to 54-P, for transmission on a respective physical interface. Communication traffic for a single interface to the filter system 24 is scheduled out of the queues 34-1 to 34-M by the scheduler 36, and communication traffic is scheduled out of the queues 54-1 to 54-P to respective physical interfaces by the schedulers 56, 58.

Communication traffic received from the scheduler 36 is distributed to the filtering modules 44-1 to 44-N by the demultiplexer 42, which is one illustrative example of a component by which communication traffic received on an interface may be distributed between the filtering modules 44-1 to 44-N. Each filtering module 44-1 to 44-N of the filter system 24 receives and filters a respective communication traffic stream for which isolation from other communication traffic streams is to be maintained. In one embodiment, the filtering modules 44-1 to 44-N, as well as the demultiplexer 42 and the multiplexer 46, are implemented using a Field Programmable Gate Array (FPGA), although other implementations are also contemplated.

The multiplexer 46 receives filtered communication streams provided at the outputs of the filtering modules 44-1 to 44-N, and multiplexes the filtered communication streams onto a connection to the TM device 26. Like the demultiplexer 42, the demultiplexer 46 represents one example of a component which may be used as an interface between different numbers of physical connections.

The filter statistics collector 41 and the controller 43 are provided on the same FPGA as the filtering modules 44-1 to 44-N in one embodiment. Although shown as a single component in FIG. 2, a system according to an embodiment of the invention may include one controller 43 operatively coupled to the filtering modules 44-1 to 44-N, or multiple controllers operatively coupled to respective filtering modules or groups of filtering modules. The filtering statistics collector 41 may similarly be implemented in a single component as shown, or in separate components associated with respective groups of one or more filtering modules.

The memory 45 includes one or more memory devices, illustratively solid state memory devices. Although shown in FIG. 2 as part of the filter system 24, the memory 45 may be a storage area or location of a memory device of another subsystem of the communication equipment 20.

Queues 54-1 to 54-P and schedulers 56, 58 of the TM device 26 have been described briefly above. The queue depth monitor 59 monitors the depths of the queues 54-1 to 54-P as described in further detail below, and, like the other functional components of the communication equipment 20, may be implemented in hardware, software, or some combination thereof.

The statistics aggregator 38 operates in conjunction with at least the TM device 22 and the filter system 24, and accordingly may be implemented as a separate component as shown, or integrated with the TM device 22, the filter system 24, or partially in both.

In operation, each filtering module 44-1 to 44-N receives a respective communication traffic stream and filters its received stream to thereby generate a filtered communication traffic stream. The filtered traffic streams from the filtering modules 44-1 to 44-N are provided to the TM device 26, which is one example of a downstream processing element which might be connected to the filter system 24, through the multiplexer 46.

The filtering modules 44-1 to 44-N are separately controllable to pass or filter out communication traffic from their respective received communication traffic streams. This separate control and operation of the filtering modules 44-1 to 44-N maintains isolation between N communication traffic streams in the example shown in FIG. 2. The number of filtering modules thus establishes the number of streams between which isolation can be maintained.

Differentiation and isolation of communication traffic streams may be based on any of various parameters. For example, one might desire to provide isolation of communication traffic streams associated with one or more of: different physical interfaces of the TM device 26, different destinations, different customers, different services, and different priorities. Other isolation parameters are also possible.

The controller 43 determines whether any of the filtered communication streams are congested at the TM device 26, and controls the filtering function of the filtering modules 44-1 to 44-N accordingly. If the controller 43 determines that a filtered communication traffic stream generated by a particular filtering module is congested at the TM device 26, then it causes that filtering module to filter out communication traffic from its received communication traffic stream.

This control task may be implemented in any of several ways. For example, the controller 43 may continuously provide control signals to each filtering module 44-1 to 44-N to instruct the filtering module to pass traffic or to filter traffic out of its received stream. Alternatively, the filtering modules 44-1 to 44-N could be configured to normally either pass or filter out traffic, in which case the controller 43 might provide a control signal to the filtering modules which are to perform the opposite function, i.e., to filter or pass traffic, respectively. An enable or activate type of control mechanism is also contemplated. In this case, the controller 43 provides control signals to activate filtering modules for congested streams, and/or to deactivate filtering modules for uncongested streams. An activated filtering module filters out communication traffic, whereas a deactivated filtering module passes communication traffic.

In terms of an actual control signal, the controller 43 may provide a single control signal that specifies which particular the filtering modules are to pass/filter out communication traffic, or a separate control signal for each filtering module.

In one embodiment, the controller 43 determines whether a filtered communication stream is congested at the TM device 26 through cooperation with the queue depth monitor 59. The controller 43 may poll the queue depth monitor 59 for queue depth information, or this information may be provided to the controller 43 by the queue depth monitor 59 automatically, such as at regular intervals and/or when communication traffic is stored to or scheduled out of a queue 54-1 to 54-P, for example. If the controller 43 determines that a given filtered communication stream is congested, which in this embodiment relates to the depth of one or more of the traffic queues 54-1 to 54-P which store communication traffic of the filtered communication traffic stream, then it controls the corresponding one of the filtering modules 44-1 to 44-N to filter out communication traffic from its received communication stream.

Any of various divisions of function between the controller 43 and the queue depth monitor 59 may be implemented in the communication equipment 20. Consider an example implementation in which congestion is determined on the basis of one or more queue depth thresholds. The queue depth monitor 59 may detect the amounts of information stored in the queues 54-1 to 54-P, and then either the queue depth monitor 59 or the controller 43 may determine whether the queue depths are above or below the threshold(s). The component which makes the threshold determination may be configured to interpret a queue depth which coincides with a threshold as being either below or above the threshold.

Where the queue depth monitor 59 compares queue depths with the threshold(s), the controller 43 is effectively informed of the congestion state of each queue 54-1 to 54-P, or each group of queues where communication traffic for a communication traffic stream is stored in more than one queue. In this case, the congestion determination operation of the controller 43 involves receiving an indication of congestion from the queue depth monitor 59.

As noted above, the controller 43 may itself determine the threshold statuses of the queues 54-1 to 54-P based on the amounts of traffic stored in the queues and one or more threshold(s).

Thus, the controller 43 may receive from the queue depth monitor 59 an indication of absolute amounts of communication traffic stored in the queues 54-1 to 54-P, and/or an indication of relative amounts of communication traffic stored in the queues 54-1 to 54-P in relation to one or more congestion thresholds.

Several multiple-threshold scenarios are possible. In one embodiment, the same congestion thresholds are applied to all queues to support multiple levels or degrees of filtering module control for all communication traffic streams. A first threshold may be established, during configuration of the equipment 20 by network operator personnel for instance, to define a first queue depth associated with a first degree of congestion. A higher threshold may then be used to delineate a more serious congestion state, and so on. The controller 43 is then able to determine a degree of congestion of a congested filtered communication traffic stream, and to control an amount of communication traffic filtered out of a received communication stream by the filtering module that generates the congested filtered communication traffic stream. Where two degrees of congestion are supported, the controller 43 might cause a filtering module to pass traffic in a communication stream when a queue depth is below a first threshold, to filter out a certain priority of traffic when a queue depth is above the first threshold, and to filter out additional traffic when the queue depth is above a second threshold.

According to another embodiment, different thresholds are applied to different queues. This multiple threshold arrangement would support per queue congestion determination, and may be useful, for example, where different filtering schemes are to be provided for different streams and/or different types of traffic in the same stream. As shown in FIG. 2, the number of filtering modules, N, need not necessarily be the same as the number of queues, P, in the TM device 26. Thus, multiple queues may be used to store traffic for the same stream, such as different priority traffic of a stream. Separate queue depth determinations in this case would provide for more targeted filtering of communication traffic streams. When only a low priority queue 54-1 to 54-P for a stream is above its threshold for instance, the filtering module 44-1 to 44-N for that stream could be controlled to filter out only low priority traffic.

A further threshold scheme may involve different thresholds for different "directions" of queue depth changes. The same threshold need not always be used to determine when to adjust the filtering applied to a communication traffic stream. The controller 43 might cause a filtering module to start filtering out traffic from a communication traffic stream when a queue reaches one threshold, but not cause the filtering module to pass all traffic until the queue depth falls below a lower threshold, for example.

Information transfer between the queue depth monitor 59 and the controller 43 may take any of various forms. In one embodiment, the queue depth monitor 59 is configured to format queue depth information into a predetermined message format which the controller 43 can interpret. Messages sent from the queue depth monitor 59 to the controller 43 may identify the queues 54-1 to 54-P and congestion states of the queues. Each message may identify a particular queue and its congestion state, or a message may include information associated with multiple queues. As noted above, the queue depth monitor 59 may provide the controller 43 with absolute or relative queue depth information.

Queue depth messages may also include other information, to enable verification techniques such as parity checking to be applied, so as to allow corrupted messages to be detected and ignored. Any of various error handling mechanisms may be used to recover from corrupted messages, or other messaging problems such as lost messages. The particular error handling mechanism might be dependent on the queue depth reporting scheme. Where the controller 43 polls the queue depth monitor 59 for queue depth information, for example, the controller could simply poll the queue depth monitor again if a response message is corrupted or not received within a certain time period.

Other queue information and messaging formats are also contemplated. For example, information provided to the controller 43 by the queue depth monitor 59 may identify communication traffic streams instead of or in addition to queues. The present invention is not limited to any particular information or messaging format.

In addition to providing isolation between communication traffic streams, any or all of the filtering modules 44-1 to 44-N may be configured to provide selective filtering of their respective communication traffic streams. Filtering preferences, which affect the particular traffic filtered out of a communication traffic stream by a filtering module, may be based on one or more of: communication traffic priority, communication traffic profile, and possibly other communication traffic characteristics. Where multiple congestion degrees are supported, for example, a filtering module 44-1 to 44-N might filter non-conformant or out-of-profile traffic out of its received communication stream when its filtered communication stream is experiencing a first degree of congestion at the TM device 26. Responsive to a determination of a second degree of congestion, the controller 43 may cause the same filtering module to filter out all out-of-profile traffic and low priority in-profile traffic. At a higher level of congestion, the same filtering module might filter out all traffic until queue depths fall below congestion thresholds.

The statistics aggregator 38 provides another function which may be desirable in some embodiments. One disadvantage of non-selective discards of communication traffic in conventional traffic management techniques, as might occur if a downstream TM device were directly connected to a higher throughput upstream TM device, is that tracking of discarded traffic is not possible. In the event that incoming traffic exceeds the bandwidth that can be handled by the TM device 26 in a conventional system, for example, at least some of the incoming traffic is simply dropped at the input of the TM device 26, and is not actually received or processed by the TM device 26. There is no way of tracking the amounts, types, classes, or any other characteristics of the dropped traffic.

In the filter system 24, however, even though the filtering modules 44-1 to 44-N may discard traffic from received communication-traffic streams, these discards are trackable. Each filtering module 44-1 to 44-N, or a single filter statistics collector 41 as shown in FIG. 2, may maintain a record of discarded traffic in the memory 45, for example. Statistics collected by the filter statistics collector 41 may include any or all of amounts, types, classes, physical media, priorities, sources, destinations, services, and/or other parameters associated with traffic that is filtered out of received communication traffic streams.

The TM device 22 may similarly collect statistics on communication traffic that is dropped when its queues 34-1 to 34-M are full.

The statistics aggregator 38 obtains the collected statistics from the TM device 22 and from the filter system 24, directly from the filter statistics collector 41 and/or the memory 45, and aggregates those statistics. This provides a record, which may be stored in the memory 45 for access by network operator personnel for example, of overall traffic discards/drops which occur upstream of the TM device 26. Traffic discards/drops thus become trackable as though traffic management functions were provided at the TM device 22 for N isolated communication traffic streams, even though the TM device 22 may support traffic management functions for substantially fewer than N streams.

Consider an example scenario in which EF and BE IP traffic for a service A is directed to the queue 34-1 in the TM device 22, the multiplexer 42 in the filter system 24 maps the EF and BE traffic to different filtering modules 44-1, 44-2, respectively, and the TM device 26 maps traffic for the service A to the queue 54-1. If depth of the queue 54-1, as detected by the queue depth monitor 59, indicates that the queue 54-1 can no longer accept out-of-profile traffic, then the controller 43 controls the filters 44-1, 44-2 to filter out such traffic. The filter statistics collector 41 counts any resulting out-of-profile EF and BE filter discards at 44-1, 44-2. Using this mechanism, the statistics aggregator 38 is able to report out-of-profile discard counts for both the EF and BE IP traffic associated with the service A. These discard counts could also be aggregated with discard counts for the queue 34-1 to determine overall traffic discards for the service A.

Figure 3:
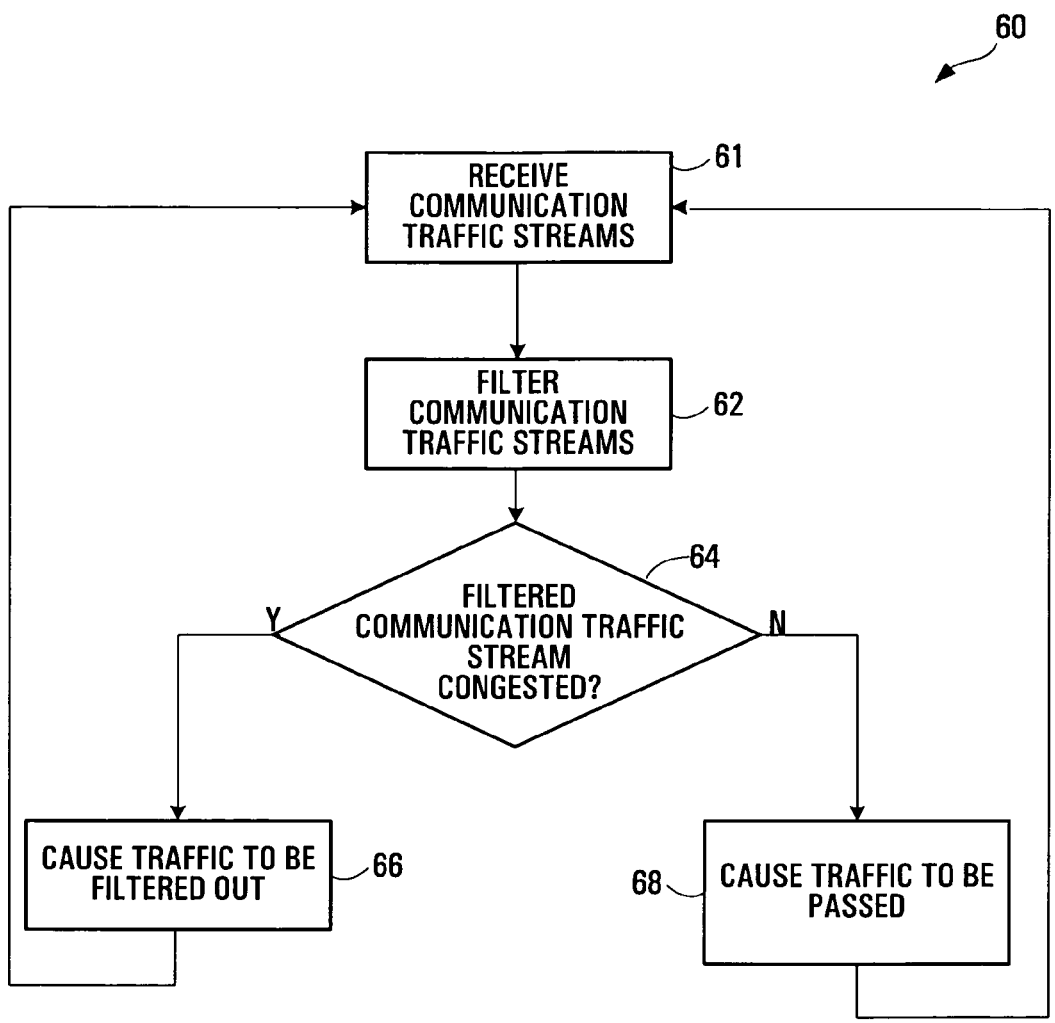
FIG. 3 is a flow diagram of a communication traffic control method.

Communication equipment incorporating an embodiment of the invention has been described above. However, other embodiments of the invention are also contemplated. For example, an embodiment of the invention may be implemented as a communication traffic control method, an example of which is illustrated in the flow diagram of FIG. 3.

The method 60 begins with an operation 61 of receiving communication traffic streams. The communication traffic streams are filtered at 62 to generate filtered communication traffic streams. As described above, this operation may involve passing all traffic of a received communication traffic stream or filtering at least some traffic out of the stream.

At 64, a determination is made as to whether a filtered communication traffic stream is congested at a downstream communication traffic processing element. If a filtered communication traffic stream is congested, then an operation 66 of causing communication traffic to be filtered out of a received communication traffic stream associated with the congested filtered communication traffic stream is performed. This may involve providing a control signal to a filtering module, for example. Traffic of a received communication traffic stream is passed into a filtered communication traffic stream if the filtered communication traffic stream is not congested, as indicated at 68.

It should be appreciated that the method 60 is intended solely for illustrative purposes. Other embodiments of the invention may involve performing the operations in any of various ways and/or include further, fewer, or different operations performed in a similar or different order than shown in FIG. 3. For example, the filtering operation at 62 may involve different levels of traffic passing/filtering out, corresponding to different degrees of congestion. A method may also include statistics gathering and/or aggregation operations, as described above. Further variations, some of which have been described above, are also contemplated.

Embodiments of the invention disclosed herein may allow limited-channel existing communication equipment components to be used in conjunction with a more highly channelized TM device or other component.

Per channel and/or per flow isolation, or more generally per stream isolation, can also be provided at 10 G+ sustained traffic rates for numbers of communication traffic streams on the order of hundreds or more.

In one possible embodiment, a filter system is implemented using cut-through discard filtering modules in an FPGA rather than performing any queueing. This greatly simplifies the filter and FPGA design, and provides the further benefit of reducing the amount of memory which would otherwise be required. Less memory also reduces power requirements, physical space requirements, and heat generation.

Using the techniques proposed herein, virtually any TM devices having differing capabilities can be tied together, while taking advantage of the scaling and throughput of both devices. Per port and per channel isolation can be maintained as traffic flows from a higher rate TM block to a lower rate TM block, for example. Embodiments of the invention provide a general purpose mechanism for achieving isolation on a large number of ports/channels/flows when traffic is passed from one high throughput congestion point to a lower speed congestion point when there is no means of backpressuring the first congestion point, or when it is undesirable to do so, such as where backpressuring will cause discards to occur on flows/channels that are not causing congestion. Conventional systems would typically either perform unfair discards or require a superior TM device at the higher rate TM block.

One possible application of embodiments of the invention is to increase the supported channelization of an existing router or other communication equipment without having to significantly modify an ingress path, switch fabric, and other existing components.

Embodiments of the invention also provides traffic control without backpressure, and are thus compatible with TM devices that can accept only a limited number of different backpressure signals.

What has been described is merely illustrative of the application of principles of embodiments of the invention. Other arrangements and methods can be implemented by those skilled in the art without departing from the scope of the present invention.

For example, systems and method according to embodiments of the invention may include further, fewer, or different components or operations which are interconnected or performed in a different manner than explicitly shown in the drawings. In FIG. 2, for instance, the TM devices 22, 26 may include different numbers of schedulers than specifically shown, the filter system 24 may include multiple controllers and/or multiple filter statistics collectors, and/or the statistics aggregator 38 may also or instead be operatively coupled to the TM device 26. The division of functions represented in FIG. 2 is similarly illustrative and not limiting.

It should also be appreciated that implementation of an embodiment of the invention does not necessarily preclude other traffic management functions, such as conventional backpressuring of the scheduler 36 from physical interfaces (not shown) of the TM device 22.

In addition, although described primarily in the context of methods and systems, other implementations of the invention are contemplated, as instructions stored on a machine-readable medium, for example.

We claim:

1. A communication traffic control system comprising: a filter system comprising a number N of filtering modules, wherein N is greater than 1, each filtering module being configured to receive communication traffic from a first communication traffic management device, to filter its respective received communication traffic using cut-through discard filtering, and to provide a respective filtered communication traffic stream at a respective output, the output of each filtering module to be operatively coupled to a second communication traffic management device, the first communication traffic management device having a first throughput capacity and a number M of queues to store communication traffic and to provide isolation between M communication traffic streams, wherein M is less than N, the second communication traffic management device having a second throughput capacity and a number P of queues to store the filtered communication traffic streams received from the filter system and to provide isolation between P communication traffic streams, wherein P is greater than M, the first throughput capacity of the first communication traffic management device being higher than the second throughput capacity of the second communication traffic management device; and a controller operatively coupled to the filtering modules and configured to control each filtering module to filter out communication traffic from its respective received communication traffic responsive to determining that the respective filtered communication traffic stream is congested at the second communication traffic management device, wherein at least one of the controller and the filter system is implemented using hardware.

2. The system of claim 1, wherein the controller is configured to determine whether a filtered communication traffic stream is congested at the second communication traffic management device based on amounts of communication traffic stored in the P queues of the second communication traffic management device.

3. The system of claim 2, wherein the controller is configured to receive from the second communication traffic management device an indication of one or more of: absolute amounts of communication traffic stored in the P queues of the second communication traffic management device, and relative amounts of communication traffic stored in the P queues of the second communication traffic management device in relation to one or more congestion thresholds.

4. The system of claim 3, wherein the communication traffic received by the filtering modules comprises P communication traffic streams, wherein the controller is configured to receive the indication in one or more messages identifying the P communication traffic streams and congestion states of the P communication traffic streams.

5. The system of claim 1, wherein the controller is further configured to determine a degree of congestion of a congested filtered communication traffic stream, and to control an amount of communication traffic filtered out of communication traffic received by a filtering module associated with a congested filtered communication traffic stream based on the degree of congestion of the congested filtered communication traffic stream.

6. The system of claim 1, wherein the communication traffic received by the filtering modules comprises P communication traffic streams, wherein the P communication traffic streams comprise traffic streams associated with one or more of: different physical interfaces of the second communication traffic management device, different destinations, different customers, different services, and different priorities.

7. The system of claim 1, further comprising:
a filtering statistics collector operatively coupled to the filtering modules and configured to collect statistics associated with communication traffic that is filtered out of the received communication traffic by each filtering module.

8. The system of claim 7, wherein the first communication traffic management device is further configured to collect statistics associated with communication traffic that is dropped by the first communication traffic management device, and wherein the system further comprises:
a statistics aggregator operatively coupled to the filtering statistics collector and to the first communication traffic management device, and configured to aggregate the statistics collected by the filtering statistics collector and the first communication traffic management device.

9. The system of claim 1, wherein each filtering module is configured to filter communication traffic out of its respective received communication traffic in accordance with filtering preferences.

10. Communication equipment comprising:
the system of claim 1.

11. Communication equipment comprising:
the system of claim 1;
the first communication traffic management device; and
the second communication traffic management device.

12. A communication traffic control method comprising: receiving communication traffic from a first communication traffic management device having a first throughput capacity and a number M of queues to store communication traffic and to provide isolation between M communication traffic streams; filtering the received communication traffic at a number N of filtering modules using cut-through discard filtering to provide respective filtered communication traffic streams to a second communication traffic management device, wherein N is greater than M, at least one of the filtering modules being implemented using hardware, the second communication traffic management device having a second throughput capacity and a number P of queues to store the filtered communication traffic streams received from the filtering modules and to provide isolation between P communication traffic streams, wherein P is greater than M, the first throughput capacity of the first communication traffic management device being higher than the second throughput capacity of the second communication traffic management device; determining whether a filtered communication traffic stream is congested at the second communication traffic management device; and causing a filtering module to filter communication traffic out of received communication traffic that is associated with a congested filtered communication traffic stream.

13. The method of claim 12, wherein determining comprises determining based on one or more of absolute and relative amounts of communication traffic stored in the P queues of the second communication traffic management device.

14. The method of claim 12, wherein determining comprises determining a degree of congestion of a congested filtered communication traffic stream, and wherein causing comprises controlling an amount of communication traffic filtered out of communication traffic received by a filtering module based on the degree of congestion of the congested filtered communication traffic stream.

15. The method of claim 12, further comprising:
collecting statistics associated with communication traffic that is filtered out of the received communication traffic by the filtering modules.

16. The method of claim 15, wherein the first communication traffic management device collects statistics associated with communication traffic that is dropped by the first communication traffic management device, and wherein the method further comprises:
aggregating the statistics associated with communication traffic that is filtered out of the received communication traffic by the filtering modules and the statistics associated with communication traffic that is dropped by the first communication traffic management device.

17. The method of claim 12, wherein filtering comprises filtering communication traffic out of the received communication traffic in accordance with filtering preferences.

18. The method of claim 17, wherein the filtering preferences comprise preferences based on one or more of: communication traffic priority, communication traffic profile, and other communication traffic characteristics.

* * * * *